UNITED STATES PATENT OFFICE.

PETER POUCIN, OF MINNEAPOLIS, MINNESOTA.

IMPROVED MEDICAL COMPOUND.

Specification forming part of Letters Patent No. 55,534, dated June 12, 1866.

*To all whom it may concern:*

Be it known that I, PETER POUCIN, of Minneapolis, in the county of Hennepin and State of Minnesota, have invented certain new and useful Improvements in a Medical Compound; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in combining the following ingredients in the proportions and manner as follows, to wit: Take of white ginger-root, one-fourth pound; aloes, one-fourth pound; gum-camphor, three ounces; beaver's gall, one-half ounce; sassafras, three ounces; gum-myrrh, three ounces. Mix with one gallon of best Madeira wine for females, or same quantity of cognac brandy for males. Let it stand for eight days, then strain and bottle tight, and it is ready for use.

The mixture thus prepared is intended to be used as a tonic, and is specially useful in cases of fever and ague and all similar ailments.

Having thus described my medicine and the manner of preparing the same, what I claim is—

The medical compound composed of the ingredients united in the proportions and manner as above set forth.

PETER POUCIN.

Witnesses:
 S. PHELPS,
 DAN. M. DEMMON.